United States Patent
Lei et al.

(10) Patent No.: US 11,698,776 B2
(45) Date of Patent: Jul. 11, 2023

(54) METHOD AND SYSTEM FOR PROCESSING COMPUTER CODE

(71) Applicant: Weta Digital Limited, Wllington (NZ)

(72) Inventors: Richard Chi Lei, Wellington (NZ); Florian Deconinck, Wellington (NZ); John McCarten, Wellington (NZ); Leo Hutson, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 94 days.

(21) Appl. No.: 17/185,775

(22) Filed: Feb. 25, 2021

(65) Prior Publication Data

US 2022/0027133 A1    Jan. 27, 2022

Related U.S. Application Data

(60) Provisional application No. 63/056,450, filed on Jul. 24, 2020.

(51) Int. Cl.
| | |
|---|---|
| *G06F 8/40* | (2018.01) |
| *G06F 8/34* | (2018.01) |
| *G06F 8/41* | (2018.01) |
| *G06T 13/40* | (2011.01) |
| *G06F 8/33* | (2018.01) |

(52) U.S. Cl.
CPC .......... *G06F 8/34* (2013.01); *G06F 8/33* (2013.01); *G06F 8/41* (2013.01); *G06T 13/40* (2013.01)

(58) Field of Classification Search
CPC ..... G06F 8/33; G06F 8/34; G06F 8/41; G06F 9/445; G06T 13/40
See application file for complete search history.

(56) References Cited

U.S. PATENT DOCUMENTS

| | | | |
|---|---|---|---|
| 9,239,662 B2* | 1/2016 | Matas | ................... G06F 40/137 |
| 9,489,759 B1 | 11/2016 | Gregory | |
| 2009/0091563 A1 | 4/2009 | Viz | |

(Continued)

FOREIGN PATENT DOCUMENTS

EP    3358527 A    8/2018

OTHER PUBLICATIONS

Zeeshan Bhatti et al., Analysis of Design Principles and Requirements for Procedural Rigging of Bipeds and Quadrupeds Characters with Custom Manipulators for Animation, arxiv.org, Feb. 14, 2015, retrieved online on Aug. 25, 2022, pp. 47-67. Retrieved from the Internet: <URL: https://arxiv.org/ftp/arxiv/pap>.*

(Continued)

*Primary Examiner* — Hanh Thi-Minh Bui
(74) *Attorney, Agent, or Firm* — Trellis IP Law Group, PC

(57) ABSTRACT

An aspect provides a computer-implemented method for processing computer code. The method comprises receiving a first editable code set. In response to a first signal the method processes the first editable code set into first executable code by a first compiler within a first code processing path generating the first executable code. In response to a second signal the method both processes the first editable code set into a second editable code set, and processes the second editable code set into second executable code by a second compiler within a second code processing path generating the second executable code.

21 Claims, 7 Drawing Sheets

(56) References Cited

U.S. PATENT DOCUMENTS

| | | |
|---|---|---|
| 2011/0102424 A1 | 5/2011 | Hibbert |
| 2012/0210262 A1 | 8/2012 | Sheeler |
| 2015/0022517 A1 | 1/2015 | Jutan |
| 2016/0103828 A1 | 4/2016 | Woolf |
| 2017/0109933 A1* | 4/2017 | Voorhees ............... G06F 11/36 |
| 2019/0197754 A1* | 6/2019 | Zhao ..................... G06T 13/00 |
| 2019/0325633 A1 | 10/2019 | Miller |
| 2020/0320764 A1 | 10/2020 | Bryson |

OTHER PUBLICATIONS

T. B. Akinjala, R. Agada and J. Yan, "Animating Human Movement & Gestures on an Agent Using Microsoft Kinect," 2016 IEEE International Symposium on Multimedia (ISM), San Jose, CA, USA, 2016, pp. 369-374, doi: 10.1109/ISM.2016.0082. (Year: 2016).*

Bhali, Zeeshan, et al. "Template based procedural rigging of quadrupeds with custom manipulators." 2013 International Conference on Advanced Computer Scienve Applications and Technologies. IEEE, 2013.[Year: 2013].

Unity Manual; "Animation: working with humanoid animation"; Jan. 18, 2016; pp. 1-3; https://docs.unity3d.com/460/Documentation/Manual/AvatarCreationandSetup.html [Year: 2016].

* cited by examiner

METHOD AND SYSTEM FOR PROCESSING COMPUTER CODE

CROSS REFERENCES TO RELATED APPLICATIONS

This application claims the benefit of U.S. Provisional Patent Application Ser. No. 63/056,450, METHOD AND SYSTEM FOR PROCESSING COMPUTER CODE, filed on Jul. 24, 2020, which is hereby incorporated by reference as if set forth in full in this application for all purposes.

FIELD

The present disclosure generally relates to techniques and systems for processing computer code. More particularly the present disclosure relates to techniques for software development that take into account different developer skill levels.

BACKGROUND

Visual content generation systems are used to generate imagery in the form of still images and/or video sequences of images. The still images and/or video sequences of images includes live action scenes obtained from a live action capture system, computer generated scenes obtained from an animation creation system, or a combination thereof.

An animation artist is provided with tools that allow them to specify what is to go into that imagery. Where the imagery includes computer generated scenes, the animation artist may use various tools to specify the positions in a scene space such as a three-dimensional coordinate system of objects. Some objects are articulated, having multiple limbs and joints that are movable with respect to each other.

The animation artist may retrieve a representation of an articulated object and generate an animation sequence movement of the articulated object, or part thereof. Animation sequence data representing an animation sequence may be stored in data storage, such as animation sequence storage described below.

Various aspects of animation sequence movement involve source code that is then compiled, linked, etc. (i.e., a "build") for runtime operation efficiency. Evaluation logic within the source code may encode a series of processes that produce animation sequence movement, for example. Developers working on source code may have different levels of background knowledge and skill.

It is an object of at least preferred embodiments to address at least some of the aforementioned disadvantages. An additional or alternative object is to at least provide the public with a useful choice.

SUMMARY

In accordance with an aspect, a computer-implemented method for processing computer code comprises: receiving a first editable code set; in response to a first signal, processing the first editable code set into first executable code by a first compiler/linker within a first code processing path generating the first executable code; and in response to a second signal: processing the first editable code set into a second editable code set, and processing the second editable code set into second executable code by a second compiler/linker within a second code processing path generating the second executable code.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

An embodiment provides a computer-implemented method for processing computer code to animate a control rig, the method comprising: receiving a first editable code set including animation logic specifying how at least one animation control influences a skeletal hierarchy associated with the control rig; in response to a first signal, executing the first editable code set by using a first code processing path that provides a slower start to a faster execution; and in response to a second signal, processing the first editable code set into a second editable code set, and executing the second editable code set by using a second code processing path that provides a faster start to a slower execution relative to the first code processing path.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described below are techniques and systems for providing software developers with different paths for software code development, testing, and debugging.

Figure 1:
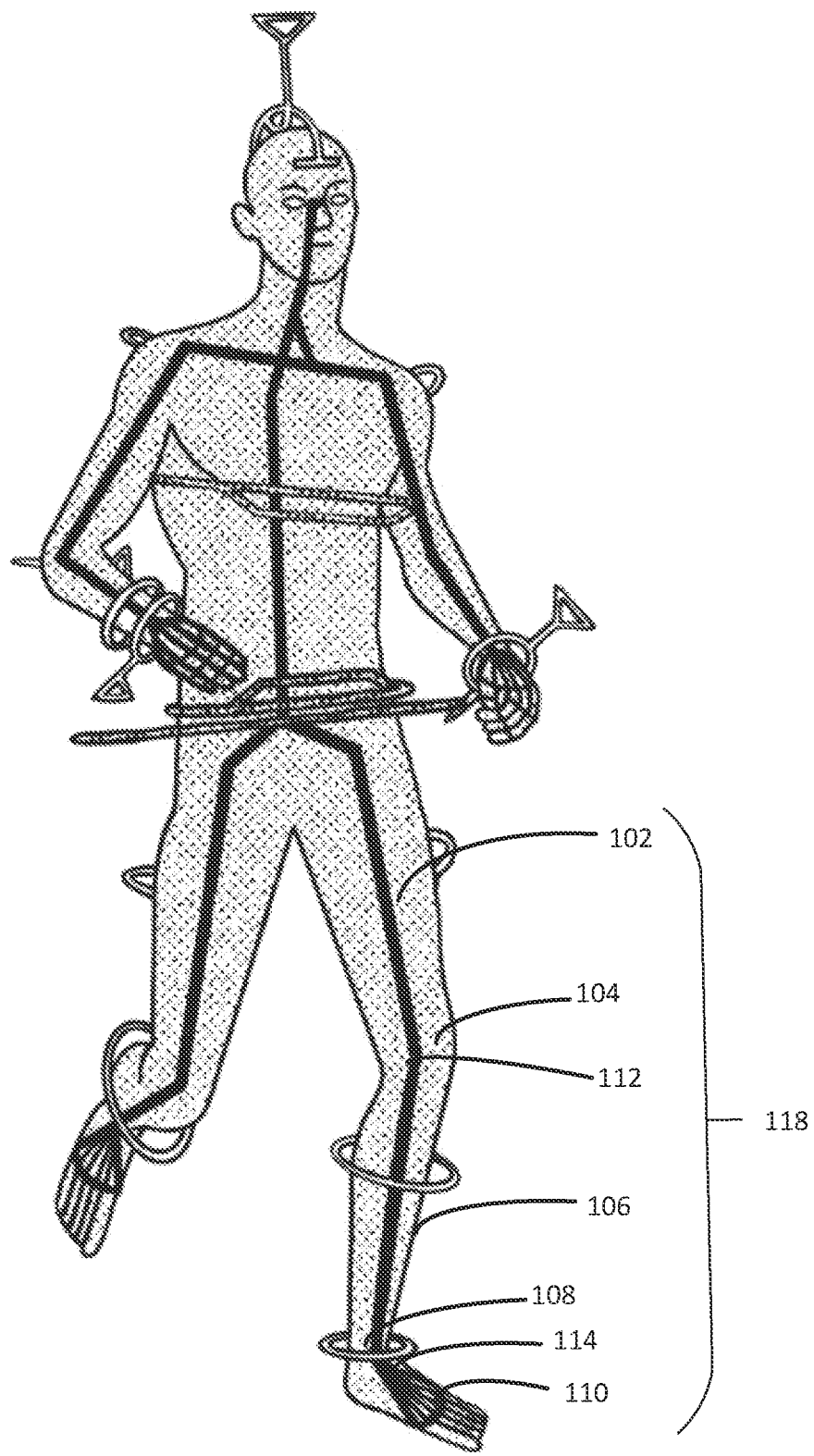
FIG. 1 shows an example of a control rig configured to enable an artist to create animation sequence data.

FIG. 1 shows an example of a control rig 100, or animated skeleton. Control rig 100 is configured to enable an artist to create animation sequence data. Animation sequence data is typically in the form of time series of data for control points of an object that has attributes that are controllable. In some examples the object includes a humanoid character with limbs and joints that are movable in manners similar to typical human movements.

Here, control rig 100 represents a humanoid character, but may be configured to represent a plurality of different characters. In an embodiment control rig 100 includes a hierarchical set of interconnected bones, connected by joints forming a kinematic chain.

For example, control rig 100 includes a thigh 102, a knee 104, a lower leg 106, an ankle 108, and a foot 110, connected by joints 112, 114. Control rig 100 may be employed to individually move individual bones and joints using forward kinematics to pose a character. Moving thigh 102 causes a movement of lower leg 106, as lower leg 106 is connected to the thigh via knee 104. Thigh 102 and lower leg 106, for example, are in a parent-child relationship. Movement of lower leg 106 is a product of movement of thigh 102 as well as movement of lower leg 106 itself. Control rig 100 may also use inverse kinematics, in which an artist moves ankle 108 for example. If an artist moves ankle 108 upwards, knee 104 consequently bends and moves upwards to accommodate a pose in which ankle 108 is at a user specified location.

Control rig 100 may be formed using a plurality of data points. Control rig 100 may be matched to a skeleton obtained from an animation system, or from, for example, motion capture markers or other means on real-life actors. A live action scene of a human actor is captured by live action capture system 702 (see FIG. 7) while wearing mo-cap fiducials for example high-contrast markers outside actor clothing. The movement of those fiducials is determined by live action processing system 722. Animation driver generator 744 may convert that movement data into specifications of how joints of an articulated character are to move over time.

Figure 2:
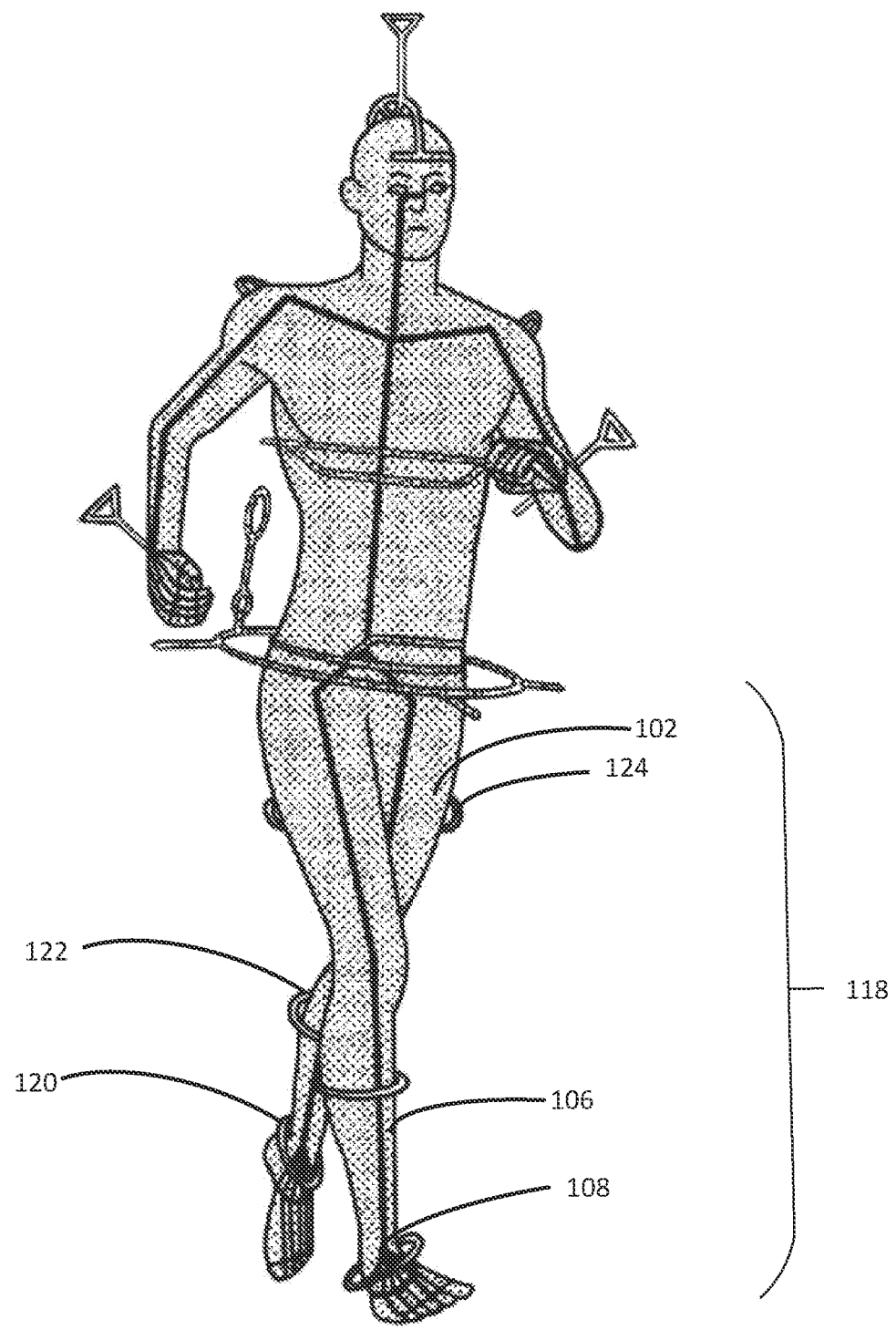
FIG. 2 shows examples of animation control points associated with the control rig of FIG. 1.

As shown in FIG. 2, control rig 100 includes a plurality of animation control points, or control points. Examples of control points are indicated at 120, 122 and 124 respectively. For example, in an embodiment control rig 100 includes control point 120 at the ankle that allows an animator to control the motion of a leg of control rig 100. In another example, control point 122 is positioned at a lower leg of the rig 100 and/or control point 124 is positioned at an upper leg. Different parts of the control rig 100 have associated to them respective control points.

In an embodiment an artist may create an animation sequence by selecting a control point on the control rig. Control rig 100 may be displayed, for example, on display 612 (see FIG. 6). The artist selects a control point using input device 614 and/or cursor control 616. The control points may be displayed as extending from a character represented by control rig 100. Displaying the control points in this manner enables the artist to select a control point easily.

The artist may, for example, select control point 122 for the lower leg or control point 124 for the upper leg of control rig 100. The artist selects a position and/or location of the control point that is different to the current position and/or location of the control point. This process is known as key-framing. The artist moves controls to new positions at given times, thereby creating key poses in an animation sequence. Interpolation is performed between key poses.

In an embodiment, control points may be used to control more than one bone, joint, etc. For example, a control may be used to control the upper arm and lower arm at the same time.

In an embodiment, at least one inverse kinematics operation is performed in order to generate the animation sequence specified by the artist. For example, the artist may wish to specify that ankle 108 is to move from a location within control rig 100 shown in FIG. 1 to a location within control rig shown in FIG. 2. The artist manipulates control point 120 to specify a desired change in ankle location.

A series of calculations is performed to determine what changes in location and/or orientation of parts of control rig 100 are required to result in an orientation of control rig shown in FIG. 2. For example, the new location of control point 120 selected by the artist may require a change in location and/or orientation of at least thigh 102, knee 104, lower leg 106, ankle 108 and foot 110. The changes in location and/or orientation that are required to achieve a goal of the artist are then determined.

Figure 3:
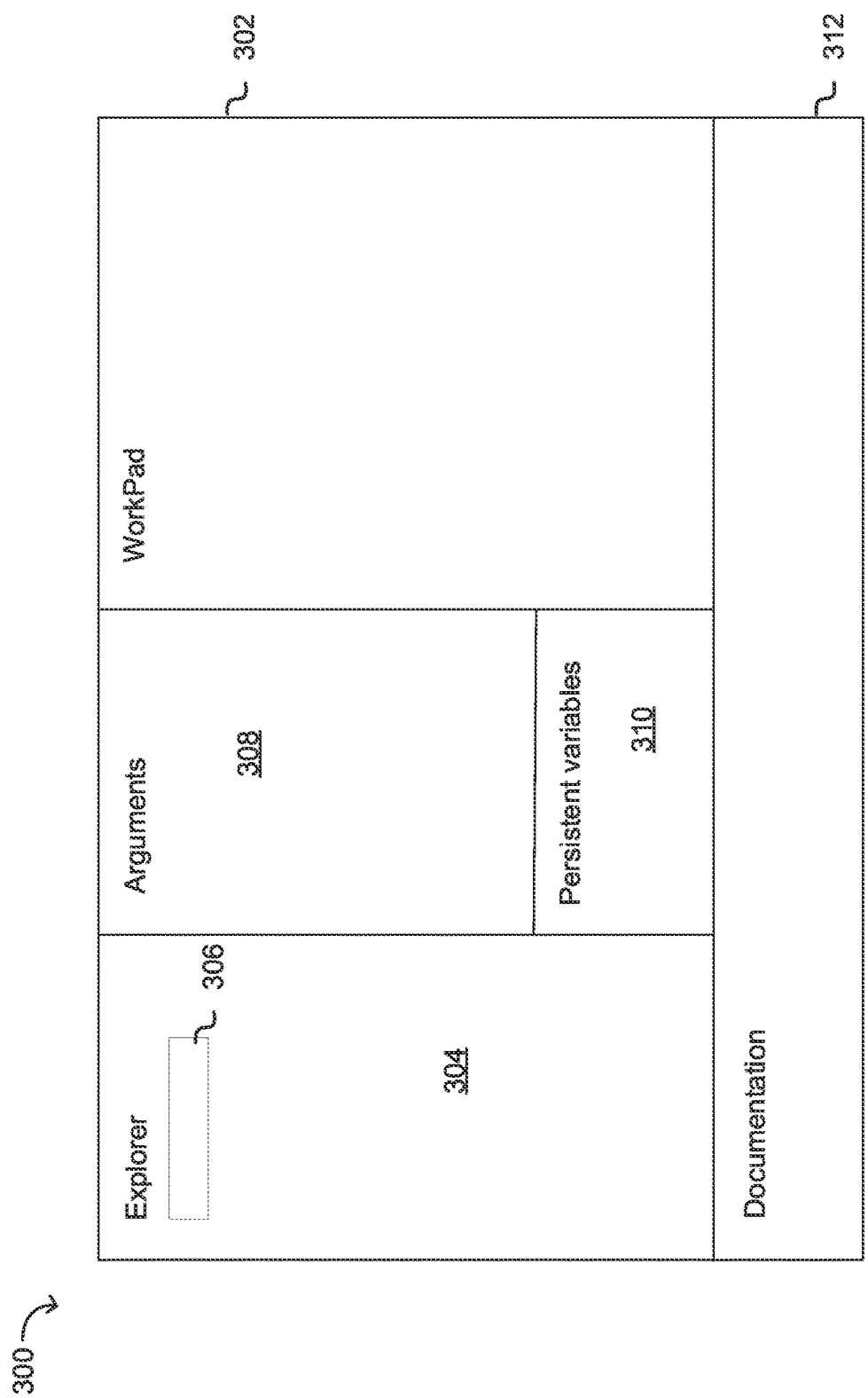
FIG. 3 shows an example of a user interface that may be used to author evaluation logic associated with the animation control rig illustrated in FIG. 1.

FIG. 3 shows an example of a user interface 300 that may be used to author evaluation logic. The evaluation logic specifies how animation controls 120, 122 and 124 (see FIG. 2) influence a skeletal hierarchy associated with control rig 100 (see FIG. 1). Animation controls may be defined and operated on using a Graphical User Interface (GUI) in an animation software package. The animation controls may then be passed as inputs to evaluation logic defined in interface 300.

Figure 6:
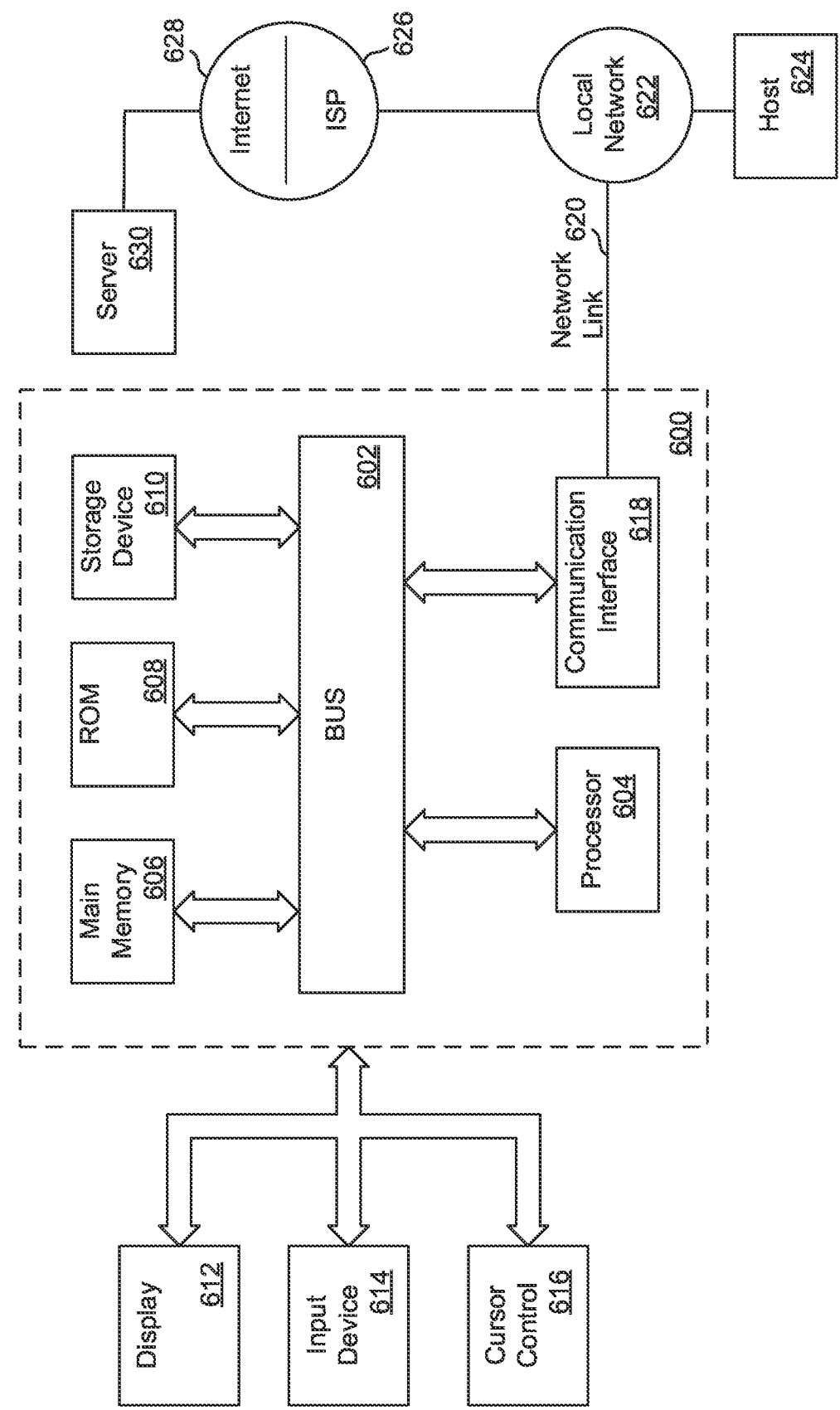
FIG. 6 is a block diagram illustrating an example computer system upon which computer systems of the systems illustrated in FIGS. 1 and 5 may be implemented.

In an embodiment user interface 300 is presented on a display, for example display 612 illustrated in FIG. 6. Inputs are received for example by a user operating input device 614 and/or cursor control 616.

In an embodiment the user interface includes a working canvas 302. The working canvas 302 is configured to receive evaluation logic from a user. Evaluation logic may include for example building blocks involving math, geometry, drawing and algorithms. Evaluation logic may also include user authored functions written in a source language such as C++ Visual Basic, Python, and the like.

In an embodiment, working canvas 302 is configured to enable the user to populate working canvas 302 using a keyboard or similar. Alternatively, or additionally, working canvas 302 is configured to be populated by a user dragging and dropping components from other windows within user interface 300.

Working canvas 302 may include controls configured to receive a user selection to expand or collapse at least some of the displayed lines of code. For example, the user may wish to expand all function calls so that they may be viewed in working canvas 302. Alternatively, the user may wish to hide all entries using a conditional selection. The user may select a control that causes at least some of the entries in the conditional to be collapsed or hidden.

User interface 300 may include an explorer panel 304. The executable code entered into the working canvas 302 may include functions and/or datatypes, data, etc. In an embodiment the explorer panel 304 includes search bar 306 that is configured to receive a user search query for at least one function or datatype. The search query is executed against a library of stored functions, datatypes, etc. The results of the user query are displayed within the explorer panel 304, for example below the search bar 306.

In an embodiment, explorer panel 304 is configured to receive a user selection of a function or datatype that is included in the results of the user query. The selected function or datatype is able to be dragged by the user and dropped into working canvas 302. In an embodiment, working canvas 302 is configured to receive a user selection for the function or datatype of a location within the executable code displayed in working canvas 302. For example, the user may drop the selected function or datatype at a selected location within the executable code.

User interface 300 may include arguments panel 308. This panel displays data that is visible to functions, modules and components having access to the executable code displayed in working canvas 302. Arguments panel 308 may display for example an argument name, whether or not the argument value is constant or mutable, an associated processor for example CPU, and a datatype for example 'int'.

User interface 300 may include persistent variables panel 310 configured to display variables that are global in nature. In an embodiment, persistent variables remain in use and keep their respective values over multiple executions of the evaluation logic. Persistent variables are not typically shared between different characters.

User interface 300 may also include documentation panel 312. In an embodiment, documentation panel 312 displays any documentation associated with a selected function. For example, user interface 300 may receive a user selection of a function. Documentation panel 312 displays documentation associated with that user selected function.

In an embodiment the evaluation logic may be executed in a linear fashion, e.g., from top to bottom. The evaluation logic displayed in working canvas 302 is packaged into an executable code object. Examples of how such executable code objects are manipulated are further described below. In an embodiment functionality provided by the evaluation logic operates from within, or in association with, a "host" animation development system such as Maya® by Autodesk®. In other embodiments, other host systems may be used. In other embodiments, features described herein may be implemented without a specific host system. In particular embodiments, the types of functionality provided by the evaluation logic can relate generally to animation production systems of the type described, for example, in "Multithreading for Visual Effects," by Watt, Coumans, et al. Released July 2014. In other embodiments, other applications are possible.

Figure 4:
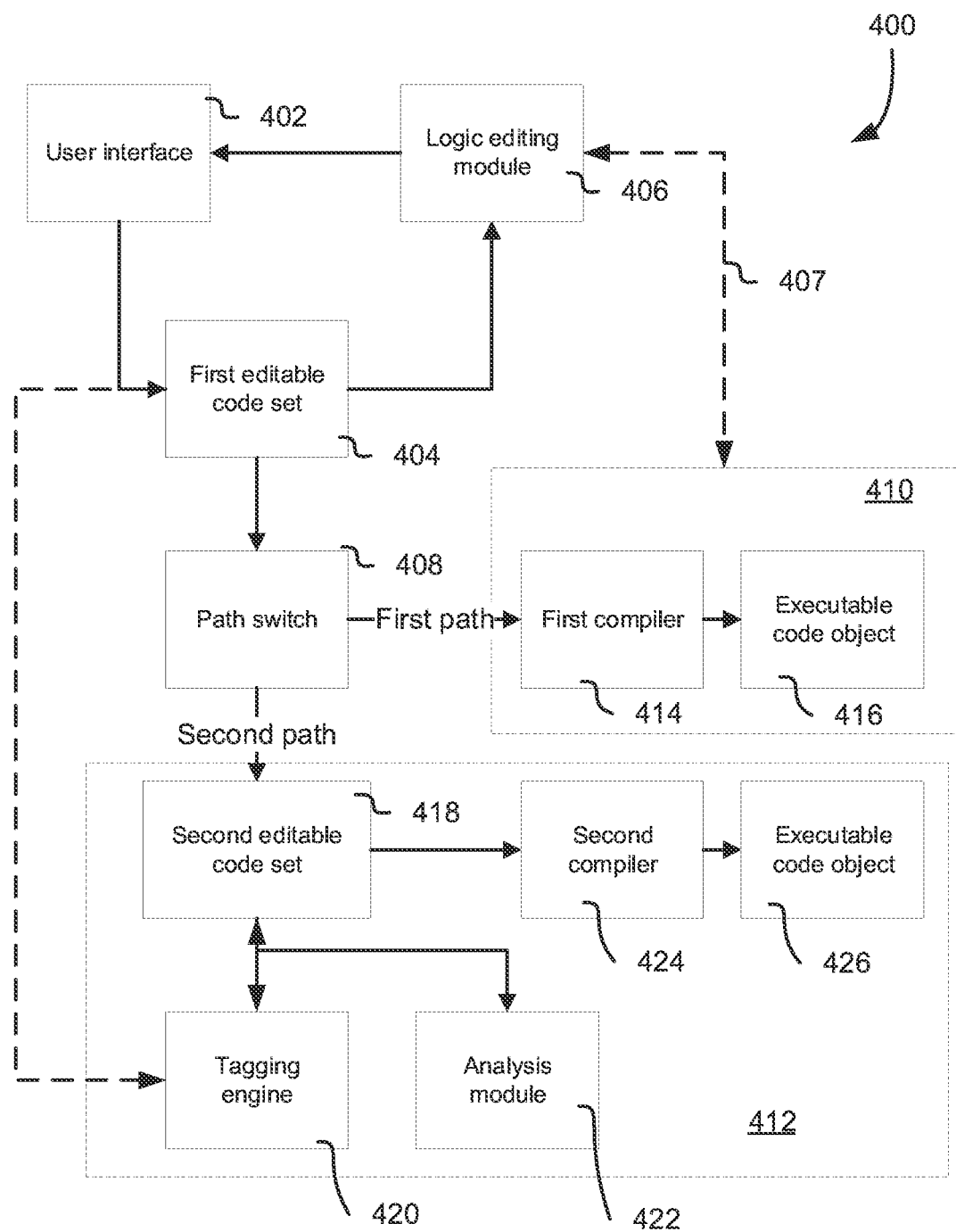
FIG. 4 shows an example of a system for compiling/linking and testing evaluation logic.

FIG. 4 shows an example of a system 400 for compiling/linking and testing evaluation logic. In an embodiment, evaluation logic is constructed within user interface 402. One example of user interface 402 includes user interface 300 from FIG. 3. As described above, user interface 300 enables a user to construct modules of evaluation logic as either function building blocks, user authored functions, or a combination of the foregoing.

Evaluation logic from user interface 402 is written to first editable code set 404. In an embodiment, first editable code set 404 is the evaluation logic constructed within the user interface.

System 400 optionally includes logic editing module 406. In an embodiment, module 406 is configured to convert first editable code set 404 into an editable set of user interface (UI) objects. A user may then edit the UI objects which in turn causes edits to be made to corresponding functions in first editable code set 404. The edited UI objects may then be passed back to user interface 404 to generate new first editable code set 404.

System 400 includes path switch 408, which is configured to enable a user to select from at least two available processing paths. It is intended that at least one of the processing paths is configured to enable analysis of at least one of the remaining processing paths. In an embodiment a user can use one path to process code that runs fast in real-time and/or another path than can operate in a test-like environment. In an embodiment, more than one of the paths can ultimately provide executable code.

In an embodiment, system 400 displays to a user at least two path options. The path options may be displayed, for example, on display 612 (see FIG. 6). A user may select a processing path, or multiple processing paths, using input device 614 and/or cursor control 616. User selection of a processing path generates for example a first signal representing a first processing path or a second signal representing a second processing path. Path switch 408 causes system 400 to carry out a processing path according to user selection.

Path switch 408 is shown in FIG. 4 as enabling first code processing path 410 and second code processing path 412. It will be appreciated that path switch 408 may enable additional code processing paths not shown in FIG. 4.

User selection of first path 410 causes first editable code set 404 to be processed by first compiler 414. Compiler 414 takes as input first editable code set 404 and generates executable code object 416, or multiple executable code objects. In an embodiment, first compiler 414 generates the executable code object as a plurality of executable code files. The executable code files may be configured and/or optimized so as to reduce processing time when executed. One example of first compiler 414 is the CLANG™ compiler. In an embodiment, executable code objects 416 are in-memory data structures. The in-memory data structures include different instructions for procedures such as function calls and conditional statements. Generally, references herein to a "compiler" or a "compilation" action also include "linking" operations. Linking allows compiled code to reference, or invoke, functionality from other code outside of the compiled source code. For example, modules or functions from utilities or libraries can be accessed by the source code instructions once the outside code is linked to the compiled source code. Other actions that may be necessary to achieve code execution (e.g., assembling, loading, etc.) should be assumed to take place where needed, even though not explicitly mentioned.

In an embodiment, logic editing module 406 is included in first code processing path as shown by dashed line 407. Path switch 408 passes the first editable code set 404 to logic editing module 406 on detecting user selection of the first path. The user may then edit the functions of first editable code set 404 before or during execution of executable code object 416 at runtime.

In an embodiment, first editable code set 404 is processed by logic editing module 406 into an editable set of User Interface (UI) objects. A user may then edit functions of the first editable code set before or during execution of executable code object 416 at runtime.

In an embodiment, logic editing module 406 is configured to generate a mapping of the UI objects to associated portions of the first editable code set. A visual representation of the mapping may be displayed, for example, on display 612 (see FIG. 6).

User selection of second path 412 causes first editable code set 404 to be processed into second editable code set 418. In an embodiment, second editable code set 418 is represented in a source language such as C++. Multiple second editable code sets 418 may be outputted to multiple locations such as CPU or GPU.

In an embodiment, tagging engine 420 is configured to insert at least one marker into second editable code set 418. The markers are intended to identify at least one portion of second editable code set 418 that correlates to at least one portion of first editable code set 404. The markers may be user readable and/or machine readable.

The markers are intended to create or at least highlight some association between first editable code set 404 and second editable code set 418. The association between the two code sets allows a user to debug first editable code set 404. For example, a C++ developer may spot an issue with C++ second editable code set 418 and then relate that back to first editable code set 404.

In an embodiment, analysis module 422 is configured to examine the second editable code set 418. For example, analysis module 422 may identify issues with second editable code set 418 in order to resolve issues with first editable code set 404. Analysis module 422 may include for example, artificial intelligence (AI) knowledge structures and automated reasoning to facilitate examining the second editable code set 418. Analysis module 422 may further include, for example, AI knowledge structures and automated reasoning to automate modification of second editable code set 418 to detect and/or resolve issues with first editable code set 404.

In an embodiment, analysis module 422 analyses at least part of the second editable code set. Analysis module 422 may identify possible modifications to the second editable code set. Examples of issues that possible modifications may address include typographical errors, errors in evaluation logic, and/or portions of code that could be optimized.

In an embodiment, analysis module 422 presents on display 612 at least some of the second editable code set for which analysis module 422 has identified possible modifications. Analysis module 422 may present on display 612 suggested modifications to at least some of the second editable code set. Analysis module may cause modifications to be made to at least some of the second editable code set.

Second processing path further includes passing the second editable code set 418 to second compiler 424, so as to generate executable code object(s) 426. In an embodiment, the time it takes for second compiler 424 to compile second editable code set 418 is longer than the time it takes for first compiler 414 to compile first editable code set 404. In an embodiment, the executable code object 416 requires a longer execution time than executable code object 426.

Figure 5:
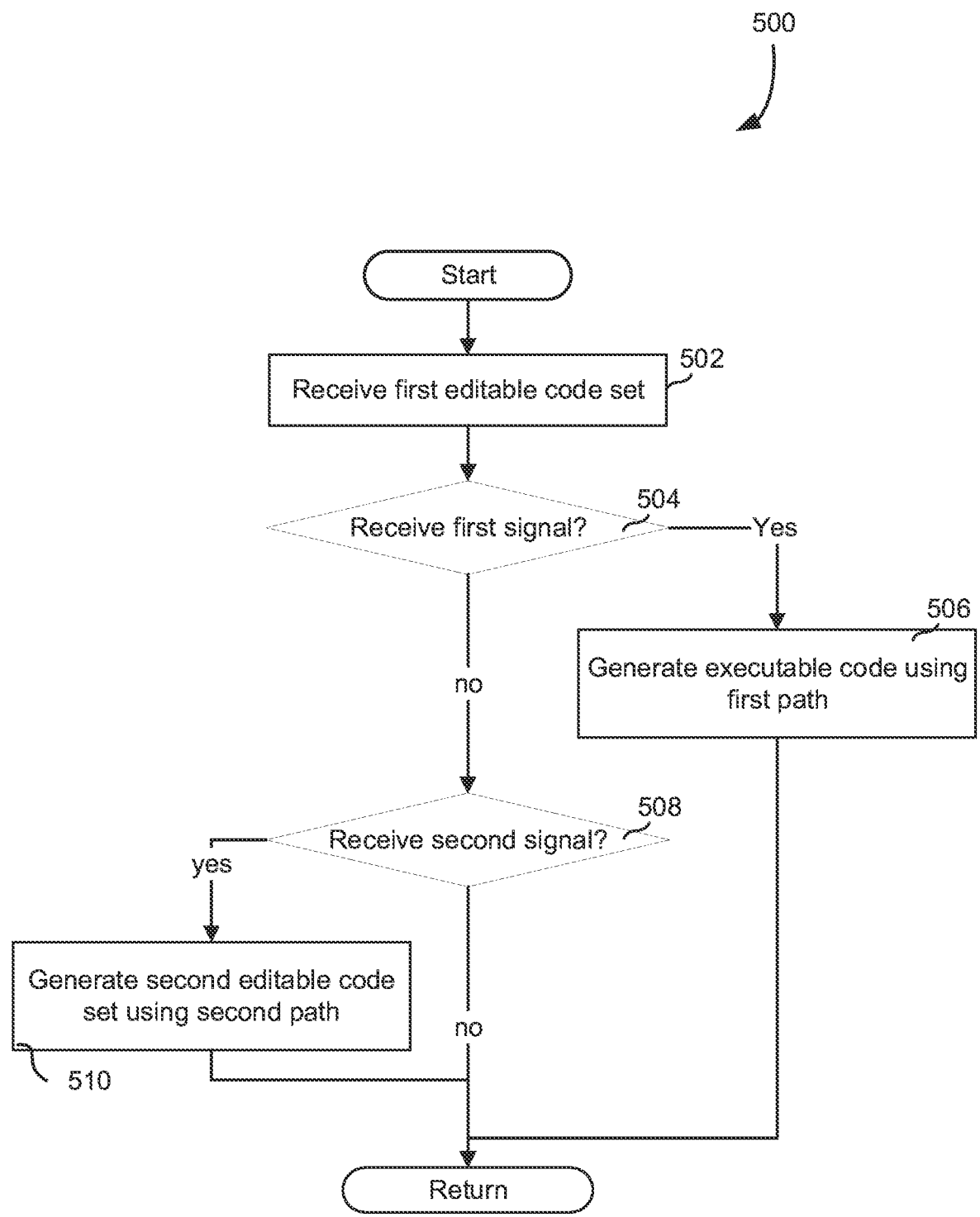
FIG. 5 shows an example of a method for processing evaluation logic.

FIG. 5 shows an example of a method 500 associated with system 400 (see FIG. 4).

Method 500 includes receiving 502 first editable code set. As described above, first editable code set may be obtained from a user interface. It may be represented in a source language such as C++.

If path switch 408 (see FIG. 4) receives 504 a first signal, method 500 follows first code processing path 410 to generate 506 an executable code object, or multiple executable code objects.

On the other hand, if path switch 408 receives 508 a second signal, method 500 follows second code processing path 412 to generate 510 second editable code set 414. In an embodiment second code processing path 412 may include additional steps omitted from FIG. 5 for simplicity. These steps may include one or more of: inserting markers into second editable code set 414 that correlate at least one portion of second editable code set 414 to at least one portion of first editable code set 404, applying analysis module 418 to second editable code set 414 to identify issues in second editable code set 414, applying analysis module 418 (including AI knowledge structures and automated reasoning) to automate modification of second editable code set 418 to detect and/or resolve issues with first editable code set 404, passing second editable code set 414 to second compiler 420 so as to generate executable code object(s) 422.

In one embodiment, first code processing path 506 accepts as input standard source code. The source code is processed using standard compilation and linking operations to produce executable code. In this first code processing path, a user would typically experience a short delay of one or a few seconds in order to compile/link/load or otherwise "build" the desired executable. The build times can vary widely depending on the size and complexity of source code.

Once the software build is done, the software can execute at fast speeds approaching optimal performance. In an embodiment, the source code is in a C++ format but in other embodiments any suitable language or script can be used.

On the other hand, second code processing path 510 can reduce or eliminate the build time by using an approach such as "interpretation" rather than compilation. In an embodiment, the desired functionality is defined by higher level representation blocks or instructions. These instructions can be represented in an array or linked list in a tokenized manner or plain text can even be used. The second code processing path thus does not require a build of the code before execution can commence. However, the actual execution of the functionality is typically slower than the compiled approach of the first processing path. Although the speed of execution of the second path can be close in speed to the first path, such as, for example, at about 90% of the speed of execution of the first path.

Thus, the user has the option of a slower start to faster execution (path 1); or a faster start to slower execution (path 2). The ability to make these selections as tradeoffs is useful in designing and testing functionality to control an animation control rig and can be useful in other aspects of animation control and design. Various types of compilation and interpretation can be used. For example, some types of compilers allow for hybrid approaches that include intermediate representations of the code. Similarly, byte-code interpreters and just-in-time compilation have characteristics of both compilers and interpreters.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 6 is a block diagram that illustrates a computer system 600 upon which the animation rig 100 (see FIG. 1), the user interface 300 (see FIG. 3) and/or the visual content generation system 700 (see FIG. 7) may be implemented. The computer system 600 includes a bus 602 or other communication mechanism for communicating information, and a processor 604 coupled with the bus 602 for processing information. The processor 604 may include, for example, a general purpose microprocessor, a CPU, a GPU, or any combination of the foregoing.

The computer system 600 also includes a main memory 606, such as a random access memory (RAM) or other dynamic storage device, coupled to the bus 602 for storing information and instructions to be executed by the processor 604. The main memory 606 may also be used for storing temporary variables or other intermediate information during execution of instructions to be executed by the processor 604. Such instructions, when stored in non-transitory storage media accessible to the processor 604, render the computer system 600 into a special-purpose machine that is customized to perform the operations specified in the instructions.

The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via the bus 602 to a display 612, such as a computer monitor, for displaying information to a computer user. An input device 614, including alphanumeric and other keys, is coupled to the bus 602 for communicating information and command selections to the processor 604. Another type of user input device is a cursor control 616, such as a mouse, a trackball, or cursor direction keys for communicating direction information and command selections to the processor 604 and for controlling cursor movement on the display 612. This input device typically has two degrees of freedom in two axes, a first axis (e.g., x) and a second axis (e.g., y), that allows the device to specify positions in a plane.

The computer system 600 may implement the techniques described herein using customized hard-wired logic, one or more ASICs or FPGAs, firmware and/or program logic which in combination with the computer system causes or programs the computer system 600 to be a special-purpose machine. According to one embodiment, the techniques herein are performed by the computer system 600 in response to the processor 604 executing one or more sequences of one or more instructions contained in the main memory 606. Such instructions may be read into the main memory 606 from another storage medium, such as the storage device 610. Execution of the sequences of instructions contained in the main memory 606 causes the processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 610. Volatile media includes dynamic memory, such as the main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 602. Transmission media can also take the form of acoustic or light waves, such as those generated during radio-wave and infra-red data communications.

Various forms of media may be involved in carrying one or more sequences of one or more instructions to the processor 604 for execution. For example, the instructions may initially be carried on a magnetic disk or solid state drive of a remote computer. The remote computer can load the instructions into its dynamic memory and send the instructions over a network connection. A modem or network interface local to the computer system 600 can receive the data. The bus 602 carries the data to the main memory 606, from which the processor 604 retrieves and executes the instructions. The instructions received by the main memory 606 may optionally be stored on the storage device 610 either before or after execution by the processor 604.

The computer system 600 also includes a communication interface 618 coupled to the bus 602. The communication interface 618 provides a two-way data communication coupling to a network link 620 that is connected to a local network 622. For example, the communication interface 618 may be an integrated services digital network (ISDN) card, cable modem, satellite modem, or a modem to provide a data communication connection to a corresponding type of telephone line. Wireless links may also be implemented. In any such implementation, the communication interface 618 sends and receives electrical, electromagnetic, or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP) 626. The ISP 626 in turn provides data communication services through the world wide packet data communication network now commonly referred to as the "Internet" 628. The local network 622 and Internet 628 both use electrical, electromagnetic, or optical signals that carry digital data streams. The signals through the various networks and the signals on the network link 620 and through the communication interface 618, which carry the digital data to and from the computer system 600, are example forms of transmission media.

The computer system 600 can send messages and receive data, including program code, through the network(s), the network link 620, and communication interface 618. In the Internet example, a server 630 might transmit a requested code for an application program through the Internet 628, ISP 626, local network 622, and communication interface 618. The received code may be executed by the processor 604 as it is received, and/or stored in the storage device 610, or other non-volatile storage for later execution.

Figure 7:
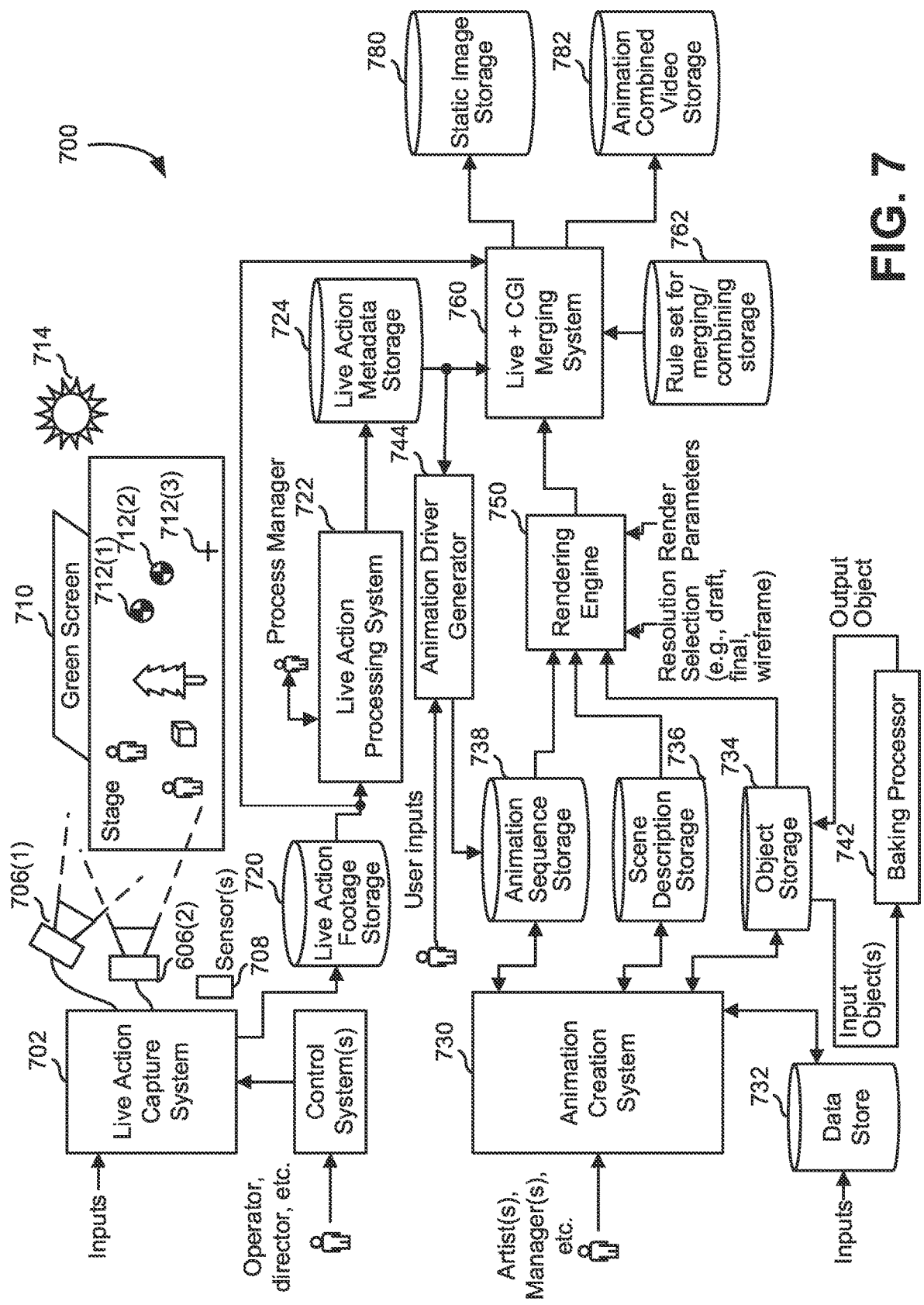
FIG. 7 illustrates an example visual content generation system as might be used to generate imagery in the form of still images and/or video sequences of images.

For example, FIG. 7 illustrates the example visual content generation system 700 as might be used to generate imagery in the form of still images and/or video sequences of images. The visual content generation system 700 might generate imagery of live action scenes, computer generated scenes, or a combination thereof. In a practical system, users are provided with tools that allow them to specify, at high levels and low levels where necessary, what is to go into that imagery. For example, a user might be an animation artist (like the artist operating animation creation system 730 illustrated in FIG. 7) and might use the visual content generation system 700 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 700 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., the artist operating animation creation system 730 illustrated in FIG. 7) might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 7, a live action capture system 702 captures a live scene that plays out on a stage 704. The live action capture system 702 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 706(1) and 706(2) capture the scene, while in some systems, there might be other sensor(s) 708 that capture information from the live scene (e.g., infrared cameras, infrared sensors, motion capture ("mo-cap") detectors, etc.). On the stage 704, there might be human actors, animal actors, inanimate objects, background objects, and possibly an object such as a green screen 710 that is designed to be captured in a live scene recording in such a way that it is easily overlaid with computer-generated imagery. The stage 704 might also contain objects that serve as fiducials, such as fiducials 712(1)-(3), that might be used post-capture to determine where an object was during capture. A live action scene might be illuminated by one or more lights, such as an overhead light 714.

During or following the capture of a live action scene, the live action capture system 702 might output live action footage to a live action footage storage 720. A live action processing system 722 might process live action footage to generate data about that live action footage and store that data into a live action metadata storage 724. The live action processing system 722 might include computer processing capabilities, image processing capabilities, one or more processors, program code storage for storing program instructions executable by the one or more processors, as well as user input devices and user output devices, not all of which are shown. The live action processing system 722 might process live action footage to determine boundaries of objects in a frame or multiple frames, determine locations of objects in a live action scene, where a camera was relative to some action, distances between moving objects and fiducials, etc. Where elements are sensored or detected, the metadata might include location, color, and intensity of the overhead light 714, as that might be useful in post-processing to match computer-generated lighting on objects that are computer-generated and overlaid on the live action footage. The live action processing system 722 might operate autonomously, perhaps based on predetermined program instructions, to generate and output the live action metadata upon receiving and inputting the live action footage. The live action footage can be camera-captured data as well as data from other sensors.

An animation creation system 730 is another part of the visual content generation system 700. The animation creation system 730 might include computer processing capabilities, image processing capabilities, one or more processors, program code storage for storing program instructions executable by the one or more processors, as well as user input devices and user output devices, not all of which are shown. The animation creation system 730 might be used by animation artists, managers, and others to specify details, perhaps programmatically and/or interactively, of imagery to be generated. From user input and data from a database or other data source, indicated as a data store 732, the animation creation system 730 might generate and output data representing objects (e.g., a horse, a human, a ball, a teapot, a cloud, a light source, a texture, etc.) to an object storage 734, generate and output data representing a scene into a scene description storage 736, and/or generate and output data representing animation sequences to an animation sequence storage 738.

Scene data might indicate locations of objects and other visual elements, values of their parameters, lighting, camera location, camera view plane, and other details that a rendering engine 750 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 730 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 734 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 732 might be used to drive object presentation. For example, if an artist is creating an animation of a spaceship passing over the surface of the Earth, instead of manually drawing or specifying a coastline, the artist might specify that the animation creation system 730 is to read data from the data store 732 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 744 might read in live action metadata, such as data representing movements and positions of body parts of a live actor during a live action scene, and generate corresponding animation parameters to be stored in the animation sequence storage 738 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 722. The animation driver generator 744 might convert that movement data into specifications of how joints of an articulated CGI character are to move over time.

A rendering engine 750 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 750 might include computer processing capabilities, image processing capabilities, one or more processors, program code storage for storing program instructions executable by the one or more processors, as well as user input devices and user output devices, not all of which are shown.

The visual content generation system 700 can also include a merging system 760 that merges live footage with animated content. The live footage might be obtained and input by reading from the live action footage storage 720 to obtain live action footage, by reading from the live action metadata storage 724 to obtain details such as presumed segmentation in captured images segmenting objects in a live action scene from their background (perhaps aided by the fact that the green screen 710 was part of the live action scene), and by obtaining CGI imagery from the rendering engine 750.

A merging system 760 might also read data from a rulesets for merging/combining storage 762. A very simple example of a rule in a ruleset might be "obtain a full image including a two-dimensional pixel array from live footage, obtain a full image including a two-dimensional pixel array from the rendering engine 750, and output an image where each pixel is a corresponding pixel from the rendering engine 750 when the corresponding pixel in the live footage is a specific color of green, otherwise output a pixel value from the corresponding pixel in the live footage."

The merging system 760 might include computer processing capabilities, image processing capabilities, one or more processors, program code storage for storing program instructions executable by the one or more processors, as well as user input devices and user output devices, not all of which are shown. The merging system 760 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 760, such as modifying boundaries of segmented objects, inserting blurs to smooth out imperfections, or adding other effects. Based on its inputs, the merging system 760 can output an image to be stored in a static image storage 770 and/or a sequence of images in the form of video to be stored in an animated/combined video storage 772.

Thus, as described, the visual content generation system 700 can be used to generate video that combines live action with computer-generated animation using various components and tools, some of which are described in more detail herein. While the visual content generation system 700 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing computer code to animate a control rig, the method comprising:
   receiving a first editable code set including animation logic specifying how at least one animation control influences a skeletal hierarchy associated with the control rig;
   in response to a first signal, executing the first editable code set by using a first code processing path that provides a slower start to a faster execution; and
   in response to a second signal, processing the first editable code set into a second editable code set;
   inserting at least one marker into the second editable code set to indicate a correlation of at least one portion of the second editable code set to at least one portion of the first editable code set;
   identifying an issue with the at least one portion of the second editable code set indicated by the at least one marker;
   debugging the at least one portion of the first editable code set, based on the identified issue of the at least one portion of the second editable code set; and
   executing the second editable code set by using a second code processing path that provides a faster start to a slower execution relative to the first code processing path,
   wherein the first signal and the second signal are generated by a user activated switch to pass the first editable code to the first code processing path or the second editable code to the second code processing path.

2. The computer-implemented method of claim 1, further comprising:
   analyzing at least a part of the second editable code set for a modification to the second editable code set.

3. The computer-implemented method of claim 2 further comprising:
   based on the identified issue performing one or more of:
      displaying on a display the at least part of the second editable code set for the modification and the modification, and
      modifying the at least part of the second editable code set to include the modification.

4. The computer-implemented method of claim 3, further comprising:
   processing the first editable code set into an editable set of (user interface) UI objects by a logic editing module within the first code processing path.

5. The computer-implemented method of claim 4, further comprising:
generating a visual mapping of the set of UI objects to associated portions of the first editable code set.

6. The computer-implemented method of claim 1, wherein the first code processing path includes compilation and linking.

7. The computer-implemented method of claim 1, wherein the second code processing path includes interpretation.

8. An apparatus for processing computer code to animate a control rig, the apparatus comprising:
one or more digital processors;
one or more non-transitory processor-readable storage device including instructions for:
receiving a first editable code set including animation logic specifying how at least one animation control influences a skeletal hierarchy associated with the control rig;
in response to a first signal, executing the first editable code set by using a first code processing path that provides a slower start to a faster execution;
in response to a second signal, processing the first editable code set into a second editable code set;
inserting at least one marker into the second editable code set to identify at least one portion of the second editable code set that correlates to at least one portion of the first editable code set;
identifying an issue with the at least one portion of the second editable code set;
debugging the at least one portion of the first editable code set, based on the identified issue of the at least one portion of the second editable code set; and
executing the second editable code set by using a second code processing path that provides a faster start to a slower execution relative to the first code processing path,
wherein the first signal and the second signal are generated by a user activated switch to pass the first editable code to the first code processing path or the second editable code to the second code processing path.

9. The apparatus of claim 8, wherein the instructions are further for:
analyzing at least a part of the second editable code set for a modification to the second editable code set.

10. The apparatus of claim 9, wherein the instructions are further for:
based on the identified issue performing one or more of:
displaying on a display the at least part of the second editable code set for the modification and the modification, and
modifying the at least part of the second editable code set to include the modification.

11. The apparatus of claim 10, wherein the instructions are further for:
processing the first editable code set into an editable set of UI objects by a logic editing module within the first code processing path.

12. The apparatus of claim 11, wherein the instructions are further for:
generating a visual mapping of the UI objects to associated portions of the first editable code set.

13. The apparatus of claim 8, wherein the first code processing path includes compilation and linking.

14. The apparatus of claim 8, wherein the second code processing path includes interpretation.

15. One or more non-transitory tangible processor-readable storage devices including instructions executable by one or more processors for processing computer code to animate a control rig, the instructions are for:
receiving a first editable code set including animation logic specifying how at least one animation control influences a skeletal hierarchy associated with the control rig;
in response to a first signal, executing the first editable code set by using a first code processing path that provides a slower start to a faster execution;
in response to a second signal, processing the first editable code set into a second editable code set;
inserting at least one marker into the second editable code set to identify at least one portion of the second editable code set that correlates to at least one portion of the first editable code set;
identifying an issue with the at least one portion of the second editable code set;
debugging the at least one portion of the first editable code set, based on the identified issue of the at least one portion of the second editable code set; and
executing the second editable code set by using a second code processing path that provides a faster start to a slower execution relative to the first code processing path,
wherein the first signal and the second signal are generated by a user activated switch to pass the first editable code to the first code processing path or the second editable code to the second code processing path.

16. The one or more storage devices of claim 15, wherein the instructions are further for:
analyzing at least a part of the second editable code set for a modification to the second editable code set.

17. The one or more storage devices of claim 16, wherein the instructions are further for:
displaying on a display the at least part of the second editable code set for the modification and the modification, and
modifying the at least part of the second editable code set to include the modification.

18. The one or more storage devices of claim 17, wherein the instructions are further for:
processing the first editable code set into an editable set of UI objects by a logic editing module within the first code processing path.

19. The one or more storage devices of claim 18, wherein the instructions are further for:
generating a visual mapping of the UI objects to associated portions of the first editable code set.

20. The one or more storage devices of claim 15, wherein the first code processing path includes compilation and linking.

21. The one or more storage devices of claim 15, wherein the second code processing path includes interpretation.

* * * * *